(12) United States Patent
Neumann

(10) Patent No.: US 10,533,532 B2
(45) Date of Patent: Jan. 14, 2020

(54) FASTENER RETENTION ASSEMBLY FOR A WIND TURBINE ROTOR

(71) Applicant: General Electric Company, Schenectady, NY (US)

(72) Inventor: Ulrich Werner Neumann, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 245 days.

(21) Appl. No.: 15/678,207

(22) Filed: Aug. 16, 2017

(65) Prior Publication Data
US 2019/0055920 A1   Feb. 21, 2019

(51) Int. Cl.
    *F03D 1/06*   (2006.01)
(52) U.S. Cl.
    CPC ......... *F03D 1/0666* (2013.01); *F03D 1/0658* (2013.01); *F05B 2260/79* (2013.01)
(58) Field of Classification Search
    CPC ...... F03D 1/0666; F03D 1/0658; F03D 80/70; F05B 2260/79
    USPC .................................................. 416/174, 205
    See application file for complete search history.

(56) References Cited

U.S. PATENT DOCUMENTS

| | | | | |
|---|---|---|---|---|
| 2015/0003986 | A1* | 1/2015 | Minadeo ................. | F16C 33/60 416/131 |
| 2018/0283362 | A1* | 10/2018 | Minadeo ................. | F03D 80/70 |
| 2019/0055920 | A1* | 2/2019 | Neumann ............. | F03D 1/0666 |

* cited by examiner

*Primary Examiner* — J. Todd Newton
(74) *Attorney, Agent, or Firm* — Dority & Manning, P.A.

(57) ABSTRACT

The present disclosure is directed to a fastener retention assembly for a wind turbine rotor. The fastener retention assembly includes a rotor hub and a pitch bearing race coupled to the rotor hub. One of the pitch bearing race or the rotor hub defines an annular slot. The pitch bearing race and the rotor hub further defines a plurality of passages extending from the slot through the pitch bearing race and the rotor hub. The fastener retention assembly also includes a plurality of fasteners coupling the rotor hub and the pitch bearing race. Each of the plurality of fasteners is at least partially positioned within the slot and one of the plurality of passages. The fastener retention assembly further includes a retaining ring partially positioned within the slot to retain the plurality of fasteners within the plurality of passages.

20 Claims, 8 Drawing Sheets

200

ALIGN EACH OF A PLURALITY OF PITCH BEARING RACE APERTURES DEFINED BY A PITCH BEARING RACE WITH ONE OF A PLURALITY OF ROTOR HUB APERTURES DEFINED BY A ROTOR HUB TO DEFINE A PLURALITY OF PASSAGES EXTENDING FROM AN ANNULAR SLOT DEFINED BY ONE OF THE PITCH BEARING RACE OR THE ROTOR HUB THROUGH THE PITCH BEARING RACE AND ROTOR HUB — 202

INSERT EACH OF A PLURALITY OF FASTENERS INTO ONE OF THE PLURALITY OF PASSAGES — 204

PARTIALLY POSITION A RETAINING RING PARTIALLY WITHIN THE SLOT TO RETAIN THE PLURALITY OF FASTENERS WITHIN THE PLURALITY OF PASSAGES — 206

FIG. 11

FASTENER RETENTION ASSEMBLY FOR A WIND TURBINE ROTOR

FIELD

The present disclosure generally relates to wind turbines. More particularly, the present disclosure relates to fastener retention assemblies for wind turbine rotors.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and a rotor having one or more rotor blades coupled to a rotor hub. The rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

A pitch bearing may rotatably couple each rotor blade to the rotor hub. In this respect, each pitch bearing may include an inner race coupled to the corresponding rotor blade and an outer race coupled to the rotor hub. For example, a plurality of fasteners may couple the outer race of the pitch bearing to the rotor hub. More specifically, the rotor hub and the outer race may define a plurality of a passages extending therethrough for receiving a plurality of bolts or other fasteners. A nut may threadingly engage each of the bolts to provide the clamping force that couples the outer race to the rotor hub. In certain configurations, the heads of the bolts may be positioned outside of the rotor hub, while the nuts may be positioned inside of the rotor hub.

During various maintenance operations of the wind turbine, such as when the pitch bearings are replaced, the nuts are removed from the bolts to decouple the outer race from the rotor hub. Nevertheless, in such instances, the bolts may fall out of the passages in the outer race and the rotor hub.

Accordingly, an improved wind turbine having a fastener retention assembly for retaining the fasteners coupling the pitch bearing to the rotor hub and/or the rotor blade would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a fastener retention assembly for a wind turbine rotor. The fastener retention assembly includes a rotor hub and a pitch bearing race coupled to the rotor hub. One of the pitch bearing race or the rotor hub defines an annular slot. The pitch bearing race and the rotor hub further define a plurality of passages extending from the slot through the pitch bearing race and the rotor hub. The fastener retention assembly also includes a plurality of fasteners coupling the rotor hub and the pitch bearing race. Each of the plurality of fasteners is at least partially positioned within the slot and one of the plurality of passages. The fastener retention assembly further includes a retaining ring partially positioned within the slot to retain the plurality of fasteners within the plurality of passages.

In another aspect, the present disclosure is directed to a method for retaining fasteners within a wind turbine rotor. The method may include aligning each of a plurality of pitch bearing race apertures defined by a pitch bearing race with one of a plurality of rotor hub apertures defined by a rotor hub to define a plurality of passages extending from an annular slot defined by one of the pitch bearing race or the rotor hub through the pitch bearing race and the rotor hub. The method may also include inserting each of a plurality of fasteners into one of the plurality of passages. Furthermore, the method may include partially positioning a retaining ring within the slot to retain the plurality of fasteners within the plurality of passages.

In a further aspect, the present disclosure is directed to a wind turbine including a tower, a nacelle mounted atop the tower, and a rotor rotatably coupled to the nacelle. The rotor includes a rotor hub and a pitch bearing race coupled to the rotor hub. One of the pitch bearing race or the rotor hub defines an annular slot. The pitch bearing race and the rotor hub further define a plurality of passages extending from the slot through the pitch bearing race and the rotor hub. The fastener retention assembly also includes a plurality of fasteners coupling the rotor hub and the pitch bearing race. Each of the plurality of fasteners is at least partially positioned within the slot and one of the plurality of passages. The fastener retention assembly further includes a retaining ring partially positioned within the slot to retain the plurality of fasteners within the plurality of passages.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 11 is a flow chart illustrating one embodiment of a method for retaining fasteners within a wind turbine rotor in accordance with aspects of the present disclosure.

Figure 1:
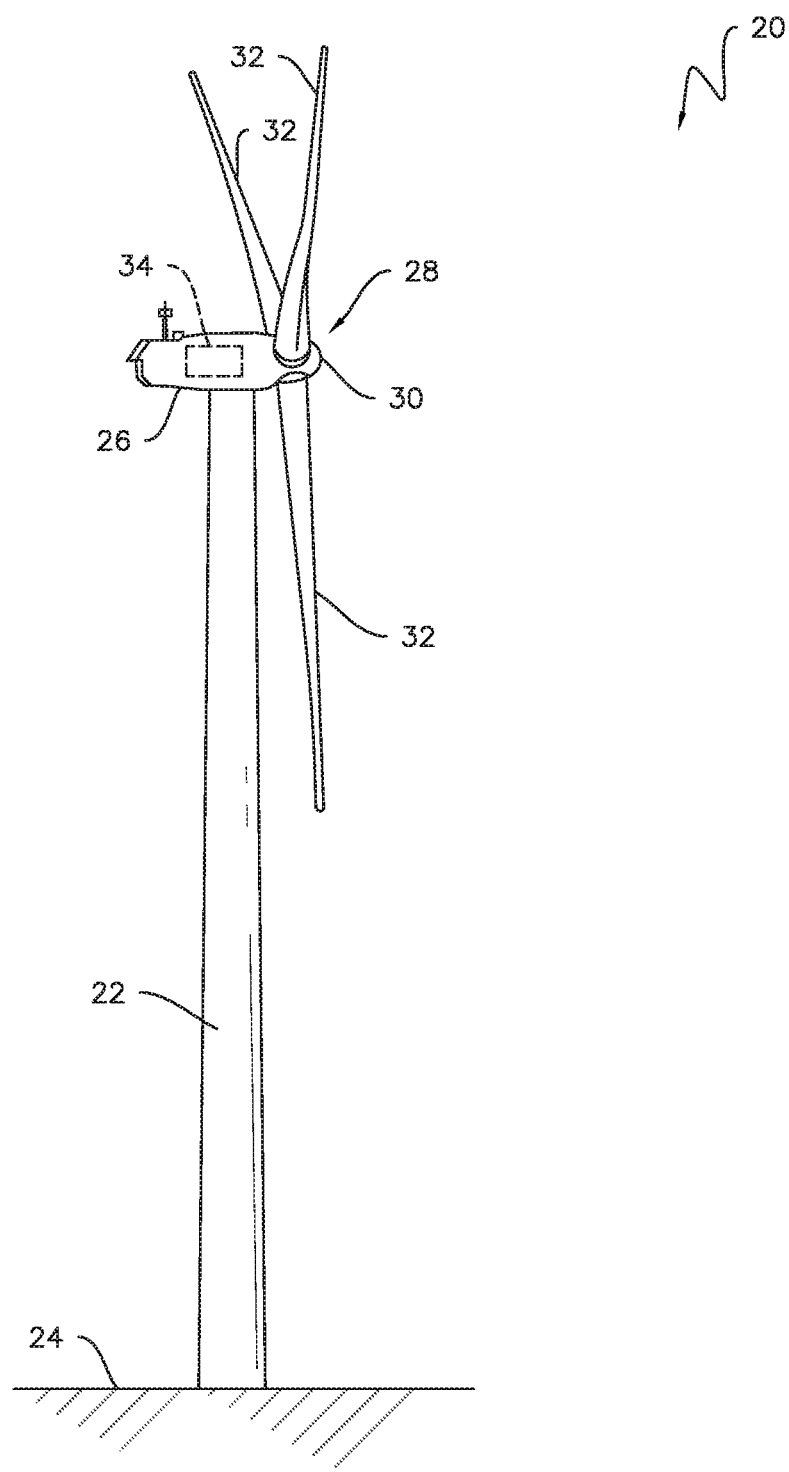
FIG. 1 is a perspective view of an exemplary embodiment of a wind turbine in accordance with aspects of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 20 in accordance with the present disclosure. As shown, the wind turbine 20 generally includes a tower 22 extending from a support surface 24, a nacelle 26 mounted on the tower 22, and a rotor 28 coupled to the nacelle 26. The rotor 28 includes a rotor hub 30 and at least one rotor blade 32 coupled to and extending outwardly from the rotor hub 30. For example, in the embodiment shown in FIG. 1, the rotor 28 includes three rotor blades 32. In alternative embodiments, however, the rotor 28 may include more or less than three rotor blades 32. Each rotor blade 32 may be spaced about the rotor hub 30 to facilitate rotating the rotor 28 to convert kinetic energy from the wind into usable rotational, mechanical energy. A generator 34 positioned in the nacelle 26 may generate electrical power from the rotational energy of the rotor 28.

Figure 2:
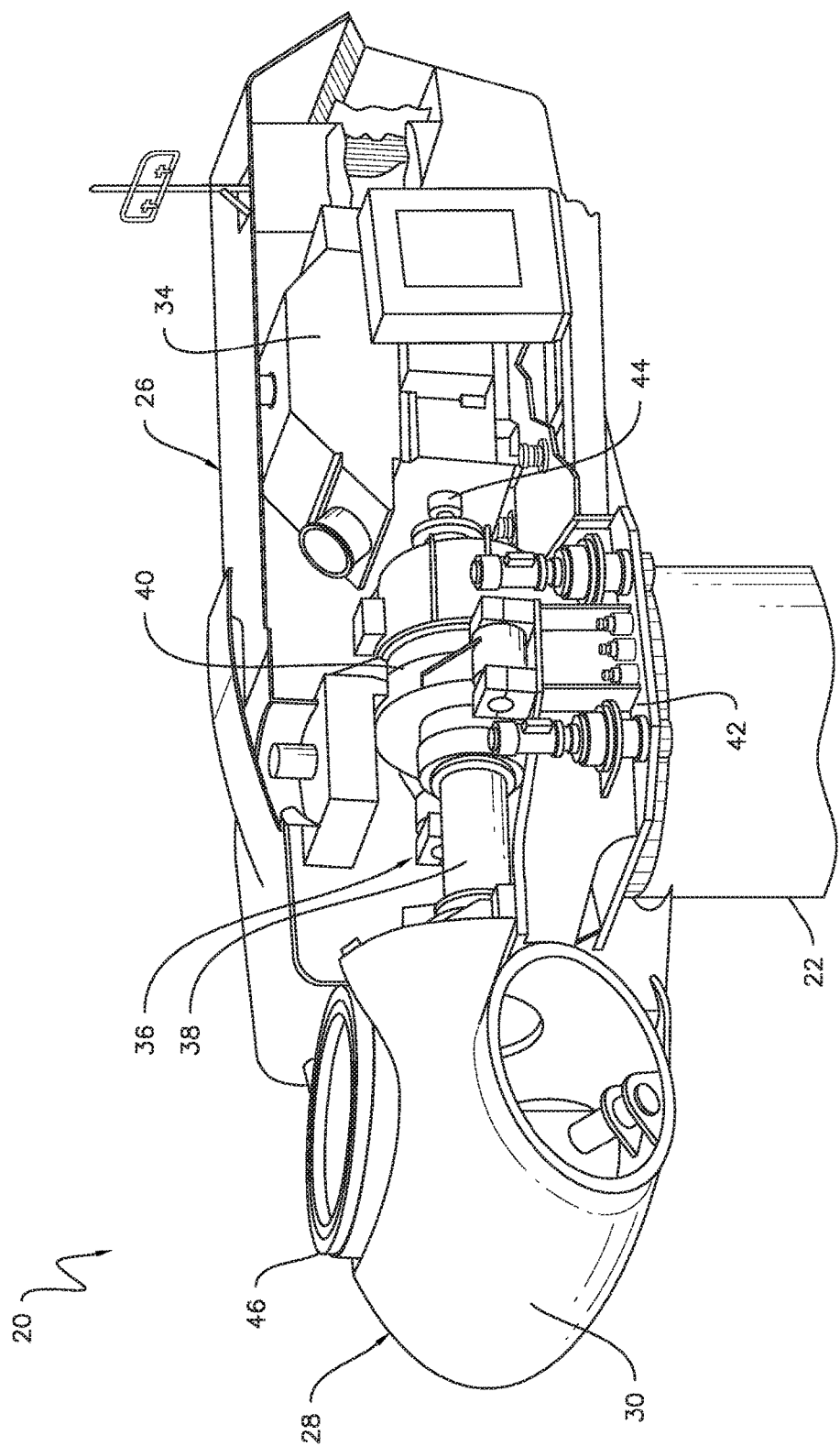
FIG. 2 is a perspective, internal view of an exemplary embodiment of a nacelle of a wind turbine in accordance with aspects of the present disclosure.

Referring now to FIG. 2, a drivetrain 36 rotatably couples the rotor 28 to the electric generator 34. As shown, the drivetrain 36 may include a rotor shaft 38, which rotatably couples the rotor hub 30 to a gearbox 40. The gearbox 40 may be supported by and coupled to a bedplate 42 in the nacelle 26. The drivetrain 36 may also include a generator shaft 44, which rotatably couples the gearbox 40 to the generator 34. In this respect, rotation of the rotor 28 drives the generator 34. More specifically, the rotor shaft 38 may provide a low speed, high torque input to the gearbox 40 in response to rotation of the rotor blades 32 and the rotor hub 30. The gearbox 40 may then convert the low speed, high torque input to a high speed, low torque output to drive the generator shaft 44 and, thus, the generator 34. In alternate embodiments, however, the generator 34 may be directly rotatably coupled to the rotor shaft 38 in a direct-drive configuration.

The wind turbine 10 may also include one or more pitch bearings 46 that rotatably couple the rotor blades 32 to the rotor hub 30. Although FIG. 2 only illustrates one pitch bearing 46, the wind turbine 10 may include three pitch bearings 46. In this respect, the wind turbine 10 may generally include one pitch bearing 46 corresponding to each rotor blade 32. In alternate embodiments, however, the wind turbine 10 may include more or fewer pitch bearings 46.

Figure 3:
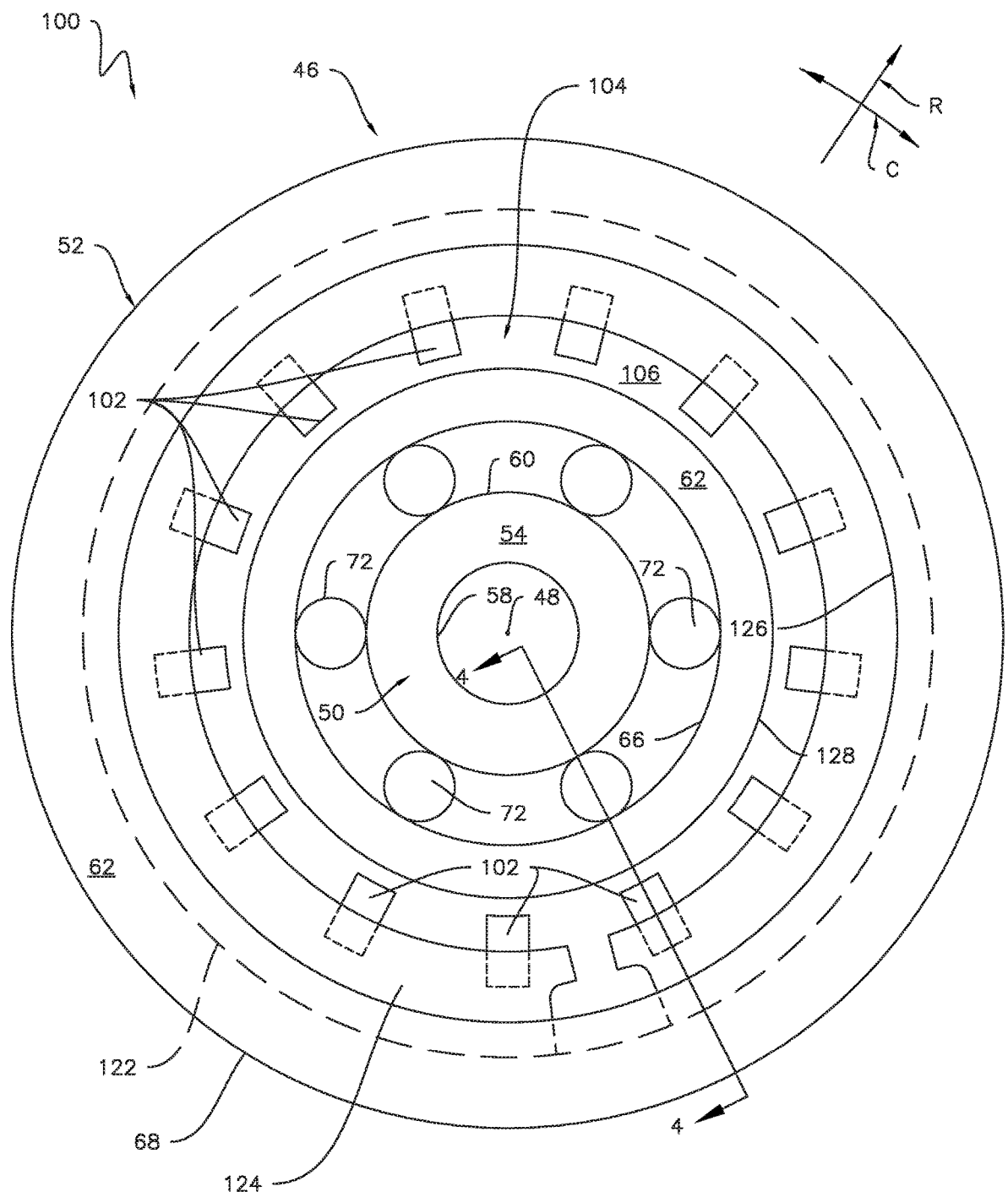
FIG. 3 is a top view of one embodiment of a fastener retention assembly for a wind turbine rotor in accordance with aspects of the present disclosure.
Figure 4:
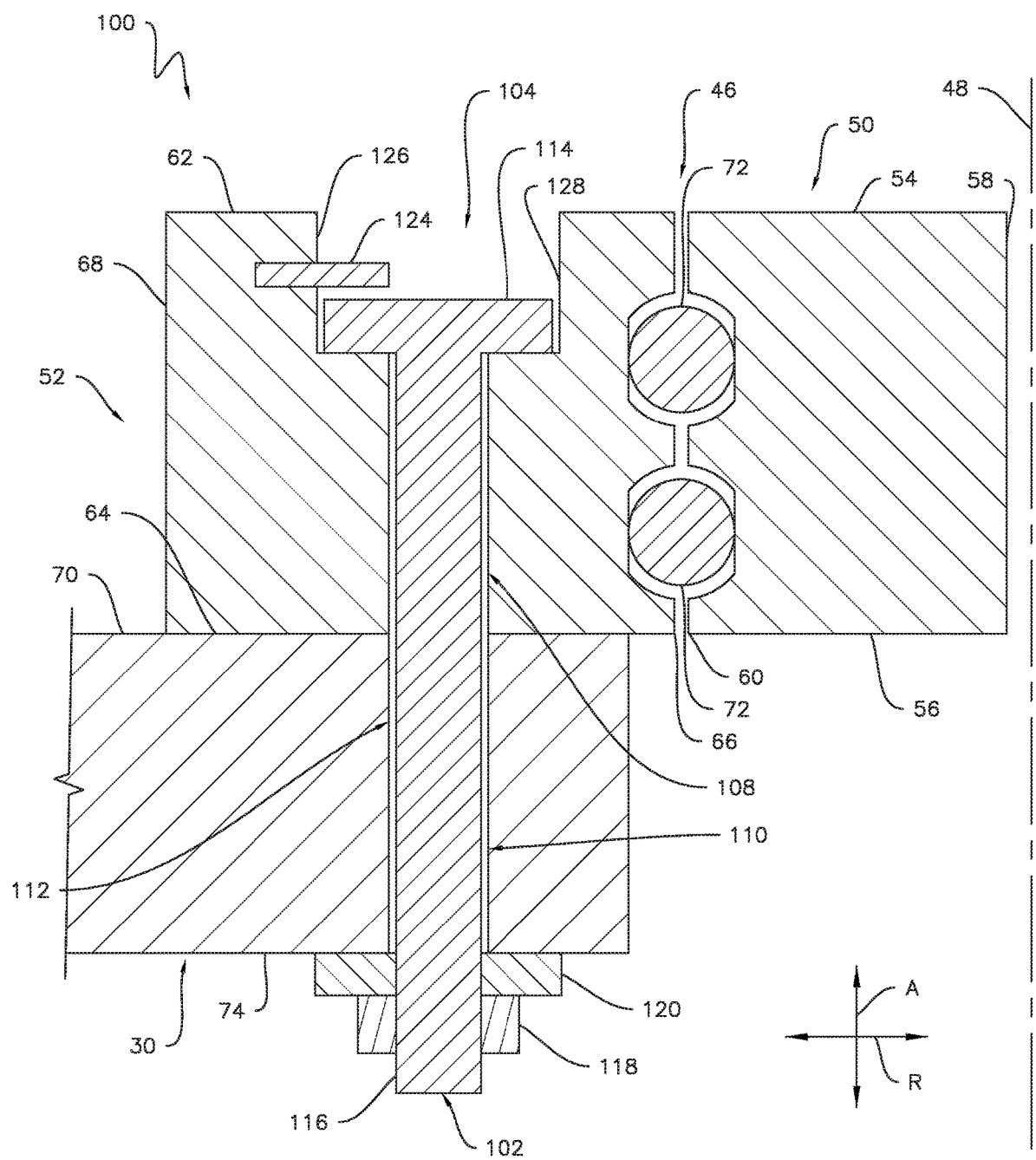
FIG. 4 is a cross-sectional view of the fastener retention assembly taken generally about line 4-4 in FIG. 3, illustrating a retention ring for retaining a plurality of fasteners within a slot of an outer race of a pitch bearing.

FIGS. 3 and 4 illustrate a fastener retention assembly 100 for retaining a plurality of fasteners, which couple one of the pitch bearings 46 to the rotor hub 30, within passages defined by the pitch bearing 46 and the rotor hub 30. Nevertheless, the fastener retention assembly 100 may be used to couple one of the pitch bearings 46 to the corresponding rotor blade 32 in alternative embodiments.

As shown, the fastener retention assembly 100 defines an axial direction A, a radial direction R, and a circumferential direction C. In general, the axial direction A extends parallel to an axial centerline 48 of the pitch bearing 46, the radial direction R extends orthogonally outward from the axial centerline 48, and the circumferential direction C extends concentrically around the axial centerline 48.

The retention assembly 100 generally includes the one of the pitch bearings 46 of the wind turbine 10. As shown in FIGS. 3 and 4, the pitch bearing 46 includes an inner race 50 and an outer race 52 radially spaced apart from and positioned circumferentially around the inner race 50. Specifically, the inner race 50 includes a first axial surface 54 axially spaced apart from a second axial surface 56 and an inner radial surface 58 radially spaced apart from an outer radial surface 60. Similarly, the outer race 52 includes a first axial surface 62 axially spaced apart from a second axial surface 64 and an inner radial surface 66 radially spaced apart from an outer radial surface 68. In particular embodiments, the inner race 50 may be coupled to the corresponding rotor blade 32 and the outer race 52 may be coupled to the rotor hub 30. For example, the second axial surface 64 of the outer race 52 may be in contact with a first axial surface 70 of the of rotor hub 30. Nevertheless, in alternative embodiments, the inner race 50 may be coupled to the rotor hub 30 and the outer race 52 may be coupled to the corresponding rotor blade 32. Furthermore, although illustrated as having generally rectangular cross-sections, the inner and outer races 50, 52 may have any suitable cross-section.

The pitch bearing 46 may also include one or more rotational elements 72 positioned radially between the inner and outer races 50, 52. In particular, the rotational elements 72 are in contact with the outer radial surface 60 of the inner race 50 and the inner radial surface 66 of the outer race 52 to facilitate relative rotational movement therebetween. In the embodiment shown in FIGS. 3 and 4, the rotational elements 72 are configured as balls. Nevertheless, in alternate embodiments, the rotational elements 72 may be pins, needles, cones, or any other suitable structure that permits relative rotation between the inner and outer races 50, 52.

As mentioned above, the outer race 62 may be coupled to rotor hub 30. In this respect, the retention assembly 100 may include a plurality of fasteners 102 that couple the outer race 62 and the rotor hub 30. As shown, the fasteners 102 may be annularly arranged about the outer race 52. In the embodiment shown in FIG. 3, the retention assembly 100 includes thirteen fasteners 102. Nevertheless, the retention assembly 100 may include any suitable number of fasteners 102 in alternative embodiments. For example, in some embodiments, the retention assembly 100 may include over one hundred fasteners 102.

Figure 5:
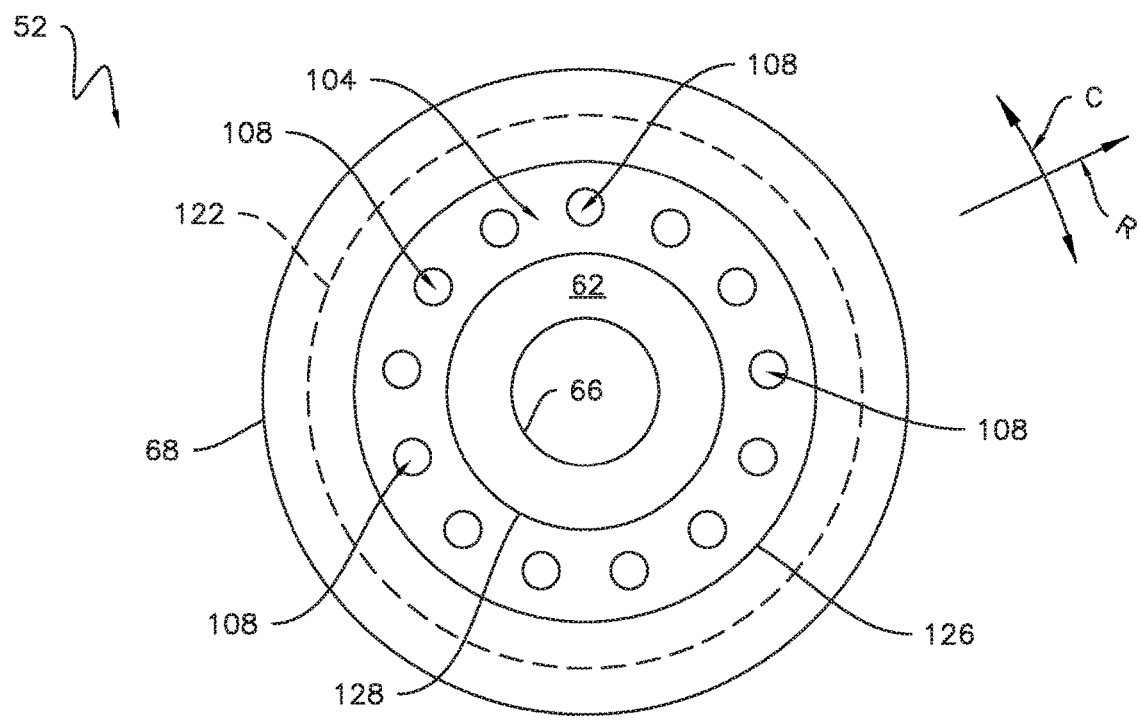
FIG. 5 is a top view of one embodiment of an outer race of a pitch bearing of a fastener retention assembly in accordance with aspects of the present disclosure.
Figure 6:
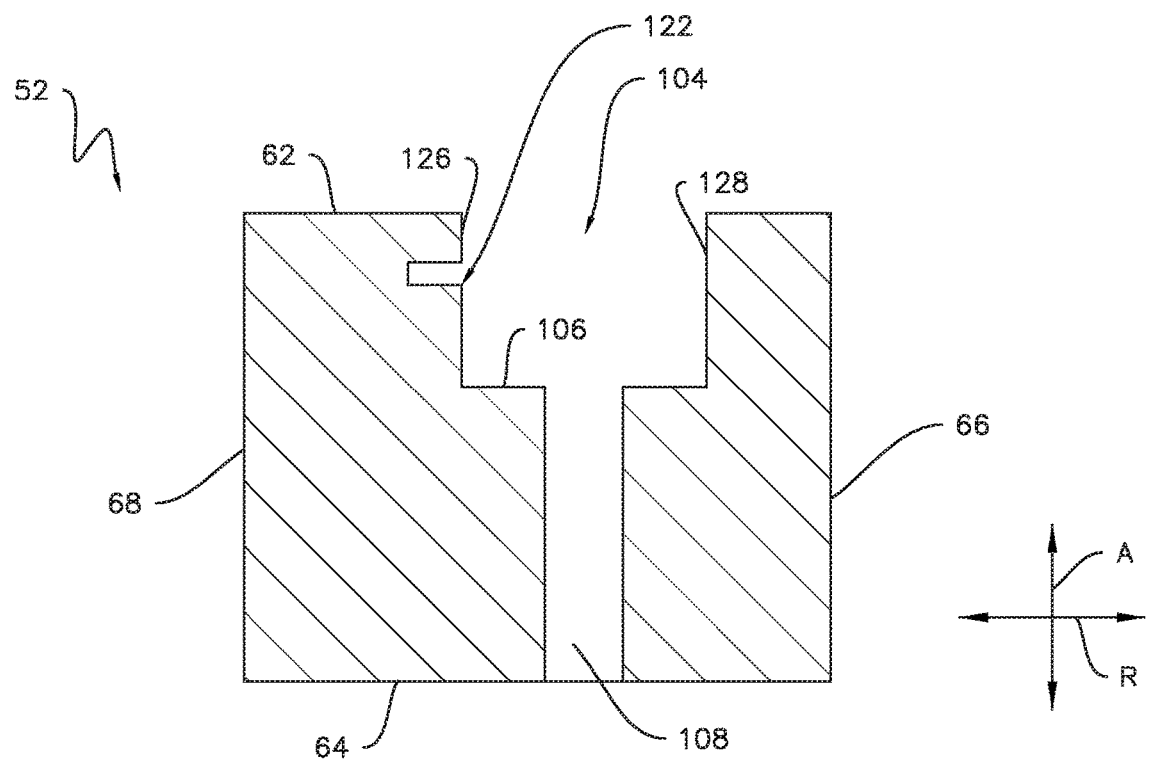
FIG. 6 is a cross-sectional view of the outer race of the pitch bearing taken generally about line 6-6 in FIG. 5, illustrating a slot and a groove defined by the outer race.

Referring now to FIGS. 3-6, the outer race 52 and the rotor hub 30 define various slots and apertures for receiving the fasteners 102. More specifically, the outer race 52 defines an annular slot 104 positioned radially between the inner and outer radial surfaces 66, 68 of the outer race 62. As shown, the slot 104 may extend axially between the first axial surface 62 of the outer race 52 and a bottom slot surface 106 of the outer race 52. As best shown in FIG. 6, the bottom slot surface 106 may be positioned axially between the first axial surface 62 of the outer race 52 and the second axial surface 64 of the outer race 52. Although illustrated as having a generally rectangular cross-section, the slot 104 may have any suitable cross-section. The outer race 52 also defines a plurality of outer race apertures 108 extending axially from the slot 104 through the second axial surface 64 of the outer race 52. Furthermore, the rotor hub 30 may define a plurality of rotor hub apertures 110 extending axially between the first axial surface 70 of the rotor hub 30 and a second axial surface 74 of the rotor hub 30. Each rotor hub aperture 110 may be radially and circumferentially aligned with one of the outer race apertures 108, thereby defining a plurality of continuous fastener-receiving passages 112 extending from the slot 104 through the second axial surface 74 of the rotor hub 30.

Referring particularly to FIGS. 3 and 4, each of the plurality of fasteners 102 coupling the outer race 52 and the rotor hub 30 are at least partially positioned within the slot 104 and the passage 112. In general, each fastener 102 includes a fastener head 114 coupled to a fastener shaft 116. As such, the fastener 102 may be a bolt as shown in FIG. 4 or any other suitable fastener. As shown, each fastener head 114 is positioned within the slot 104 and each fastener shaft 116 is at least partially positioned within one of the passages 112 defined by the outer race 52 and the rotor hub 30. A portion of each fastener shaft 116 may extend outward from each passage 112 (i.e., beyond the second axial surface of the rotor hub 30) and into the interior of the rotor hub 30. A nut 118 may threadingly engage the fastener shaft 116, thereby coupling the outer race 52 and the rotor hub 30. This connection may also include other suitable hardware, such as a washer 120. Furthermore, in certain embodiments, the fastener head 114 may have a quadrilateral cross-section, such as a square or rectangular cross-section. In such embodiments, the fastener head 114 may be sized such that the fastener head 114 is unable to rotate a full revolution within the slot.

As illustrated in FIGS. 5 and 6, the outer race 52 further defines an annular groove 122, which, as will be described in greater detail below, receives a retaining ring 124. More specifically, the groove 122 is positioned axially between the first axial surface 62 of the outer race 52 and the bottom slot surface 106 of the outer race 52. As best shown in FIG. 6, the groove 122 may extend radially outward from an outer radial slot surface 126, which partially defines the slot 104, toward the radial outer surface 68 of the outer race 52. In this respect, the groove 122 may be positioned radially between the slot 104 and the radial outer surface 68 of the outer race 52. Nevertheless, in alternative embodiments, the groove 122 may extend radially inward from an inner radial slot surface 128, which partially defines the slot 104, toward the radial inner surface 66 of the outer race 52. In such embodiments, the groove 122 may be positioned radially between the slot 104 and the radial inner surface 66 of the outer race 52. Although illustrated as having a generally rectangular cross-section, the groove 122 may have any suitable cross-section.

As mentioned above, the retention assembly 100 includes the retaining ring 124, which is partially positioned within the groove 122. More specifically, as shown in FIGS. 3 and 4, the retaining ring 124 extends radially inward (i.e., toward the inner race 50) from the groove 122 such that a portion of the retaining ring 124 is positioned within the slot 104. As shown in FIG. 4, the retaining ring 124 is radially aligned with a portion of the each fastener 102. That is, the retaining ring 124 is positioned over a portion of the fasteners 102 to prevent the fasteners 102 from sliding axially out of the slot 104 and the passages 112. In exemplary embodiments, the retaining ring 124 may be a suitable snap ring. As such, the retaining ring 124 may be integrally formed. Nevertheless, the retaining ring 124 may have any suitable configuration that retains the fasteners 102 within the slot 104 and the passages 112.

Figure 7:
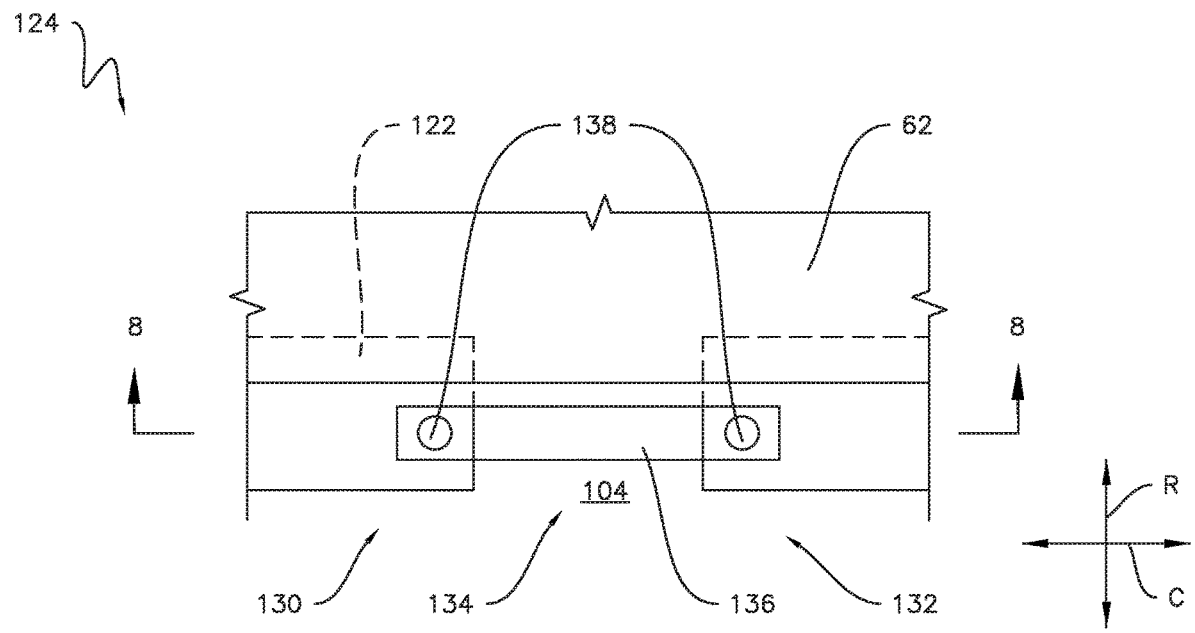
FIG. 7 is a top view of one embodiment of a portion of a retaining ring of the fastener retention assembly in accordance with aspects of the present disclosure.
Figure 8:
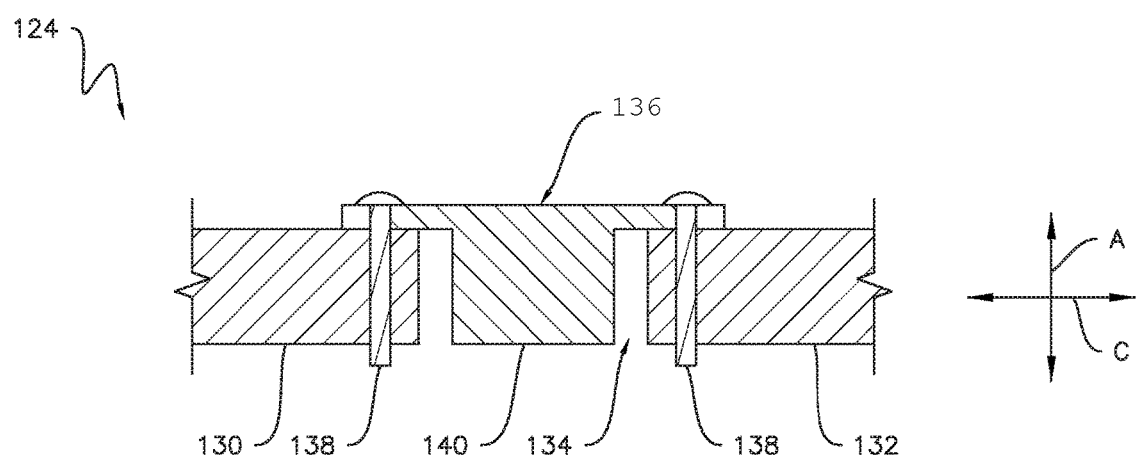
FIG. 8 is a cross-sectional view of the retaining ring taken generally about line 8-8 in FIG. 7, illustrating a clip for coupling a first end of a retention ring and a second end of the retention ring.
Figure 9:
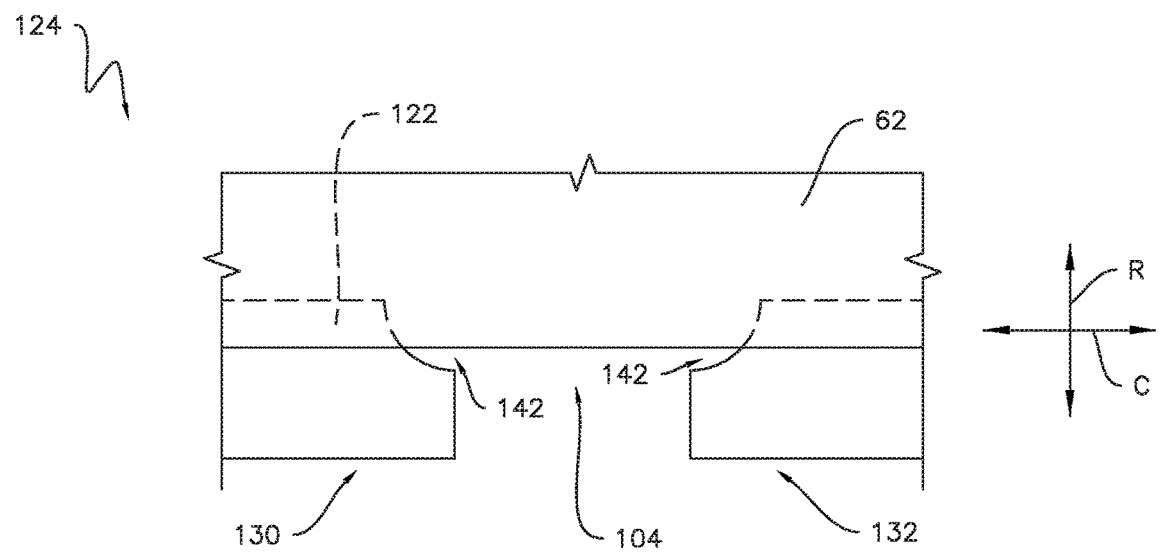
FIG. 9 is a top view of another embodiment of a retaining ring of the fastener retention assembly in accordance with aspects of the present disclosure.

As illustrated in FIGS. 7-9, the retaining ring 124 may include a first end 130 circumferentially spaced apart from a second end 132, thereby defining a gap 134 therebetween. As such, the diameter of the retaining ring 124 may be increased or decreased to permit installation into the groove 122. In the embodiment shown in FIGS. 7 and 8, a clip 136 may couple the first and second ends of the retaining ring 124 after installation into the groove 122. As such, the clip 136 may maintain the desired diameter of the retaining ring 124 by preventing the first and second ends 130, 132 from moving circumferentially relative to each other, thereby securing the retaining ring 124 within the groove 122. The clip 136 may be coupled to the first and second ends 130, 132 by rivets 138 or other suitable fasteners. In some embodiments, as shown in FIG. 8, the clip 136 may include an axially-extending projection 140 positioned within the gap 134. Furthermore, the first and second ends 130, 132 of the retaining ring 124 may have any suitable configuration. For example, as shown in FIG. 9, the first and second ends 130, 132 may each define a scallop 142, which facilitates expansion and/or contraction of the diameter of the retaining ring 124. Alternatively, as shown in FIGS. 7 and 8, the first and second ends 130, 132 may be straight cut.

Figure 10:
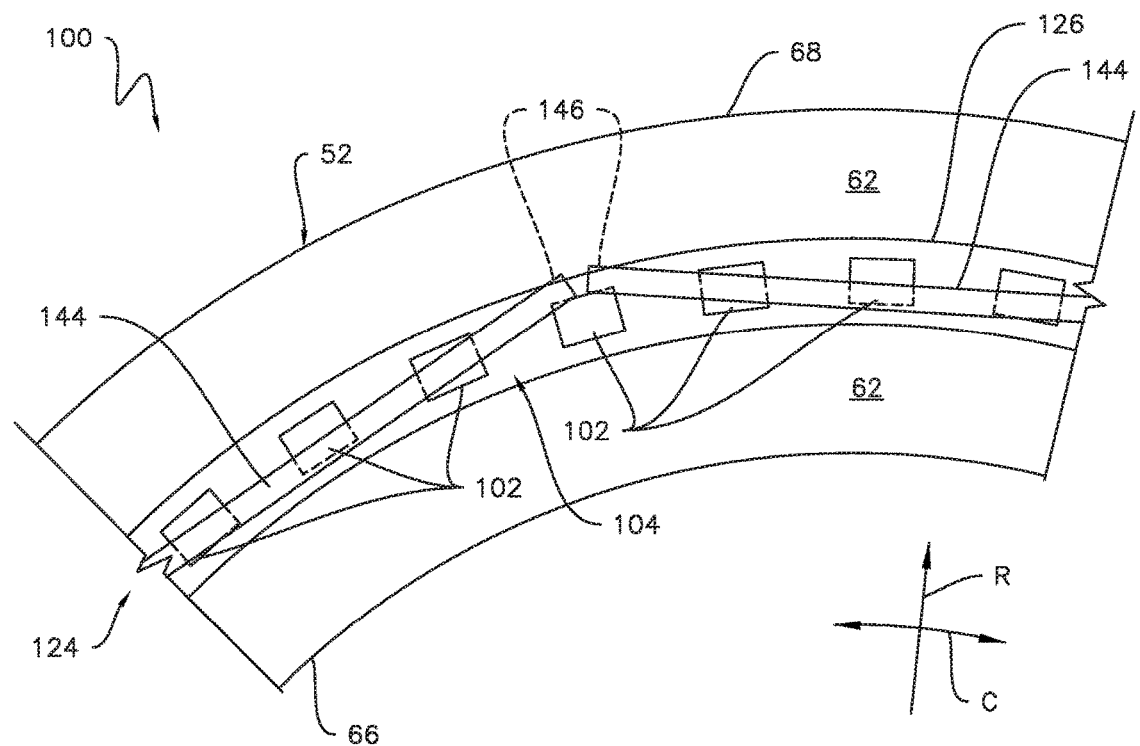
FIG. 10 is a top view of another embodiment of a fastener retention assembly for a wind turbine rotor in accordance with aspects of the present disclosure.

As mentioned above, the retaining ring 124 may be integrally formed. Nevertheless, as shown in FIG. 10, the retaining ring 124 may include a plurality of retaining ring segments 144. In general, a portion of each of the fasteners 102 is radially aligned with a portion of one of the retaining ring segments 144 such that the retaining ring segments 144 prevent the fasteners 102 from sliding axially out of the slot 104 and the passages 112. As such, the retaining ring segments 144 may be straight or arcuate bar- or rod-like members. As shown, the ends of the retaining ring segments 144 may be partially received into pockets 146 defined by the outer race 52 and extending radially outward from the slot 104. Although FIG. 10 illustrates only two retaining ring segments 144, the retaining ring 124 may include any suitable number of retaining ring segments 144 to ensure that a portion of all of the fasteners 102 are radially aligned with one of the retaining ring segments 144.

FIG. 11 illustrates one embodiment of a method (200) for retaining fasteners within a wind turbine rotor. More specifically, the method, at (202), may include aligning each of the plurality of outer race apertures 108 defined by the outer race 52 of the pitch bearing 48 with one of the plurality of rotor hub apertures 110 defined by the rotor hub 30 to define the plurality of passages 112 extending from the slot 104 through the outer race 52 and the rotor hub 30. The method (200), at (202), may also include inserting each of the plurality of fasteners 102 into one of the plurality of passages 112. Furthermore, the method (200), at (206), may include partially positioning the retaining ring 124 within the slot 104 to retain the plurality of fasteners 104 within the plurality of passages 112. For example, the method (200) may include partially positioning the retaining ring 124 within groove 122. Additionally, the method (200) may include coupling the clip 136 to the first and second ends 130,132 of the retaining ring 124.

As described in greater detail above, the retaining ring 124 is partially positioned within the slot 104. For example, the retaining ring 124 may be radially aligned with a portion of each of the fasteners 102 coupling the pitch bearing 46 to the rotor hub 30. In this respect, and unlike with conventional wind turbines, the retention assembly 100 of the wind turbine 10 prevents the fasteners 102 from sliding axially out of the slot 104 and the passages 112.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fastener retention assembly for a wind turbine rotor, comprising:
    a rotor hub;
    a pitch bearing race coupled to the rotor hub, one of the pitch bearing race or the rotor hub defining an annular slot, the pitch bearing race and the rotor hub further defining a plurality of passages extending from the slot through the pitch bearing race and the rotor hub;
    a plurality of fasteners coupling the rotor hub and the pitch bearing race, each of the plurality of fasteners at least partially positioned within the slot and one of the plurality of passages; and,
    a retaining ring partially positioned within the slot to retain the plurality of fasteners within the plurality of passages.

2. The fastener retention assembly of claim 1, wherein the pitch bearing race or the rotor hub defining the annular slot further defines an annular groove, the retaining ring being partially positioned within the groove.

3. The fastener retention assembly of claim 2, wherein the groove extends radially outward from the slot.

4. The fastener retention assembly of claim 1, wherein the retaining ring comprises a first end spaced apart from a second end, at least one of the first or second ends defining a scallop.

5. The fastener retention assembly of claim 1, further comprising:
    a clip coupling a first end of the retaining ring and a second end of the retaining ring, the first and second ends being spaced apart to define a gap between the first and second ends.

6. The fastener retention assembly of claim 5, wherein the clip comprises a projection positioned within the gap between the first and second ends of the retaining ring.

7. The fastener retention assembly of claim 1, wherein each of the plurality of fasteners comprises a head coupled to a shaft, the head being positioned within the slot and the shaft being at least partially positioned within one of the plurality of passages.

8. The fastener retention assembly of claim 7, wherein the head comprises a quadrilateral cross-section.

9. The fastener retention assembly of claim 1, wherein the retaining ring comprises a plurality of retaining ring segments.

10. The fastener retention assembly of claim 1, wherein the retaining ring is integrally formed.

11. A method for retaining fasteners within a wind turbine rotor, the method comprising:
    aligning each of a plurality of pitch bearing race apertures defined by a pitch bearing race with one of a plurality of rotor hub apertures defined by a rotor hub to define a plurality of passages extending from an annular slot defined by one of the pitch bearing race or the rotor hub through the pitch bearing race and the rotor hub;
    inserting each of a plurality of fasteners into one of the plurality of passages; and,
    partially positioning a retaining ring within the slot to retain the plurality of fasteners within the plurality of passages.

12. The method of claim 11, further comprising:
    partially positioning the retaining ring within an annular groove defined by the one of the pitch bearing race or the rotor hub defining the slot.

13. The method of claim 11, further comprising:
    coupling a clip to a first end of the retaining ring and a second end of the retaining ring, the first and second ends being spaced apart to define a gap between the first and second ends.

14. The method of claim 11, further comprising:
    coupling a nut to each of the fasteners.

15. A wind turbine, comprising:
    a tower;
    a nacelle mounted atop the tower;
    a rotor rotatably coupled to the nacelle, the rotor comprising:
        a rotor hub;
        a pitch bearing race coupled to the rotor hub, one of the pitch bearing race or the rotor hub defining an annular slot, the pitch bearing race and the rotor hub further defining a plurality of passages extending from the slot through the pitch bearing race and the rotor hub;
        a plurality of fasteners coupling the rotor hub and the pitch bearing race, each of the plurality of fasteners at least partially positioned within the slot and one of the plurality of passages; and,
        a retaining ring partially positioned within the slot to retain the plurality of fasteners within the plurality of passages.

16. The wind turbine of claim 15, wherein the pitch bearing race or the rotor hub defining the annular slot further defines an annular groove, the retaining ring being partially positioned within the groove.

17. The wind turbine of claim 16, wherein the groove extends radially outward from the slot.

18. The wind turbine of claim 15, further comprising:
a clip coupling a first end of the retaining ring and a second end of the retaining ring, the first and second ends being spaced apart to define a gap between the first and second ends.

19. The wind turbine of claim 18, wherein the clip comprises a projection positioned within the gap between the first and second ends of the retaining ring.

20. The wind turbine of claim 15, wherein each of the plurality of fasteners comprises a head coupled to a shaft, the head being positioned within the slot and the shaft being at least partially positioned within one of the plurality of passages.

* * * * *